Oct. 11, 1949.　　　T. A. RENKENBERGER　　　2,484,646
MOLD AND PATTERN SEPARATING
AND ACTUATING MECHANISM

Filed June 14, 1946　　　3 Sheets-Sheet 1

INVENTOR.
TIRZAH A. RENKENBERGER
BY
ATTORNEYS.

Oct. 11, 1949.  T. A. RENKENBERGER  2,484,646
MOLD AND PATTERN SEPARATING
AND ACTUATING MECHANISM

Filed June 14, 1946  3 Sheets-Sheet 3

INVENTOR.
TIRZAH A. RENKENBERGER.
BY
ATTORNEYS.

Patented Oct. 11, 1949

2,484,646

UNITED STATES PATENT OFFICE 2,484,646

MOLD AND PATTERN SEPARATING AND ACTUATING MECHANISM

Tirzah A. Renkenberger, Penn Township, Butler County, Pa., assignor to Herman Pneumatic Machine Company, Pittsburgh, Pa., a corporation of Pennsylvania Application June 14, 1946, Serial No. 676,659

7 Claims. (Cl. 22—52)

This invention relates to mold and pattern separating and actuating mechanism. In certain aspects it relates to mechanism for separating molds and the patterns on which they have been formed. In other aspects the invention relates to actuating mechanism adaptable for use in such separating mechanism and also adaptable for various other uses.

In the making of molds out of sand and other molding materials the molding material is packed against a pattern after which the mold and pattern are separated to enable the mold to be used for forming a casting. Great care must be taken in separating the mold and pattern to avoid damage to the mold during stripping. I here use the term "stripping" to refer specifically to the relative movement of the mold and pattern from their initial position with the mold laying against the pattern just until the mold and pattern are out of contact with each other, while "separating" is used to comprehend the entire relative movement of the mold and pattern from the beginning of stripping until relative movement ceases. The stripping must be accomplished by relative straight line movement between the mold and pattern without turning or tilting of either. If the mold and pattern turn or tilt relatively to each other during stripping the molding material of which the mold is made is likely to be deformed so that a casting poured in the mold would be defective.

It is usual in the art to provide mechanism for separating molds and the patterns on which they have been formed in conjunction with mechanism for packing the molding material against the pattern so that as soon as the packing step has been completed the mold and pattern may be separated without the necessity of transferring the assembled mold and pattern from the packing mechanism to a separating or stripping station at another location. Since ordinarily the mold and pattern are mounted on the packing mechanism it is necessary in separating them to engage the one which is to be moved, for example, the mold, at points removed from its center, and ordinarily separation is effected by engaging the flask in which the mold is formed at points spaced about its periphery to lift it up off of the pattern. It is important to avoid tilting that the means for lifting the flask and which engage it at spaced points about its periphery move uniformly. If, for example, the flask is engaged at diametrically opposed portions the means engaging the flask and moving it away from the pattern must move with absolute synchronism. This is not a new problem; it has been recognized for many years and numerous attempts to solve it have been made.

It is also important that at the time of initial engagement between the separating means and the one of the mold and pattern which is to be moved—for example, the flask containing the mold—the separating means move very slowly to avoid a sharp impact which might disturb the molding material. Likewise the relative movement between the mold and the pattern during stripping and until the mold and pattern are entirely out of contact with each other should be very slow. But during separation the mold and pattern are moved relatively to each other until they are spaced apart a substantial distance so as to facilitate subsequent separate handling of the mold and pattern without danger of their striking one another. To avoid waste of time the relative movement of the mold and pattern after stripping should be speeded up, but, particularly when the flask containing the mold is moved to effect stripping and separation, the relative movement should be terminated very gently to avoid shock which might damage the mold. This problem likewise is not new but is well recognized in the art.

It is also important to confine the separating equipment and the actuating mechanism therefor within a restricted space since floor space in a foundry is at a premium. Still another desideratum is to provide for relatively rapid movement of the separating means on the return stroke so as to avoid waste of time. Still further, in hydraulically actuated separating mechanism provision should be made for compensating upon each cycle of operation for loss of fluid by leakage since such loss may result in improper operation of the apparatus and consequent relative tilting of the mold and pattern during stripping, causing damage to the mold. These problems likewise are well recognized in the art.

In my copending application Serial No. 613,088 I have disclosed mold and pattern separating and actuating mechanism constituting an improvement over such mechanisms available prior to my invention of that application. I have further improved the mold and pattern separating and actuating mechanism by rendering the same more accurate, effective and foolproof and at the same time simplifying it and reducing its first cost and cost of upkeep.

In my said application there is disclosed mechanism comprising two operating members adapted to be moved in unison to effect a stripping or like function and separate mechanism for delivering fluid under pressure at equal rates to the operating members to cause them to move in unison. I have now devised mechanism in which I combine one of the operating members and means for delivering fluid under pressure to cause the other operating member to move in synchronism with the first mentioned operating member.

I provide mechanism for separating molds and the patterns on which they have been formed comprising means for moving one of a mold and the pattern on which it has been formed relatively to the other thereof to separate the mold and pattern, said means comprising two members movable in parallel paths, means for moving one of said members in its path, the other member being fluid operated to move in its path, means connected and movable with the first mentioned member displacing fluid, preferably liquid, upon movement of the first mentioned member to operate the second mentioned member, said last mentioned means preferably being constructed and arranged to displace liquid upon movement of the first mentioned member at such a rate as to effect movement of the second mentioned member at the same speed as the speed of movement of the first mentioned member, and connections between said members and the mold or pattern to be moved whereby separation of the mold and pattern is effected upon movement of said members. Provision is made for rendering non-uniform the speed of movement of the members so that they move relatively slowly during stripping, thereafter relatively fast and near the end of the stroke gradually slow down to a shockless stop. Provision is also made for returning the members to their initial position at higher speed than the speed at which they move in stripping.

The members above mentioned are preferably pistons operating in cylinders whose axes are parallel. Desirably there is provided a cylinder, a piston in the cylinder, a fluid inlet for admitting fluid under pressure behind the piston in the cylinder to move the piston, a second piston movable in a path parallel to the path of movement of the first mentioned piston, the second piston being fluid operated to move in its path, means connected and movable with the first mentioned piston displacing fluid, preferably liquid, upon movement of the first mentioned piston to operate the second piston, said last mentioned means preferably being constructed and arranged to displace liquid upon movement of the first mentioned piston at such a rate as to effect movement of the second piston at the same speed as the speed of movement of the first mentioned piston, and connections between the pistons and the mold or pattern to be moved whereby separation of the mold and pattern is effected upon movement of the pistons.

I preferably employ a smaller and a larger cylinder arranged in tandem, a smaller piston fitting in the smaller cylinder and having an extension extending into the larger cylinder, a larger piston fitting in the larger cylinder carried by the extension, the extension and the larger cylinder defining an annular space, a fluid inlet for admitting fluid under pressure behind the larger piston in the larger cylinder to move the pistons, a third piston movable in a path parallel to the path of movement of the first mentioned pistons, the third piston being fluid operated to move in its path, the larger piston displacing fluid, preferably liquid, from the annular space to operate the third piston. The cross-sectional area of the annular space is preferably substantially equal to the effective area of the third piston against which the fluid displaced from the annular space operates so that the pistons will move in unison.

I also provide actuating mechanism comprising a smaller and a larger cylinder arranged in tandem, a hollow piston fitting in the smaller cylinder and having an extension extending into the larger cylinder, a piston fitting in the larger cylinder carried by the extension, the end of the hollow piston opposite the extension being closed, the hollow piston containing fluid, a source of gas under pressure, a connection from the source to the interior of the closed end of the hollow piston and a passage from the interior of the hollow piston to a point within the larger cylinder behind the piston fitting therein so that gas under pressure introduced into the hollow piston through the connection may force fluid through the passage and cause the fluid to move the pistons. Desirably the cylinders are arranged generally vertically and the fluid forced through the passage by the gas causes the pistons to rise. A conduit preferably leads from the annular space defined by the extension of the hollow piston and the larger cylinder adjacent the upper end of such annular space and fluid, preferably liquid, is provided in the annular space; thus the piston in the larger cylinder forces fluid from the annular space into the conduit when the pistons are raised. The conduit preferably leads to a point within a third cylinder below the piston fitting therein. The third cylinder preferably is coaxial with the previously mentioned cylinders.

Further, another conduit is preferably provided connecting the space containing the fluid, which in this case will be liquid, in the hollow piston and the space containing the liquid delivered from the annular space and a valve is provided in that conduit which is openable to establish communication between the space containing the first mentioned liquid and the space containing the second mentioned liquid and closable to disestablish said communication.

Other details, objects and advantages of the invention will become apparent as the following description of a present preferred embodiment thereof proceeds.

In the accompanying drawings I have shown a present preferred embodiment of the invention, in which Figure 1 is a diagram showing stripping apparatus and indicating the conduits for the flow of fluid in operation thereof;

Figure 4 is a cross-sectional view through the control valve.

Figure 1:
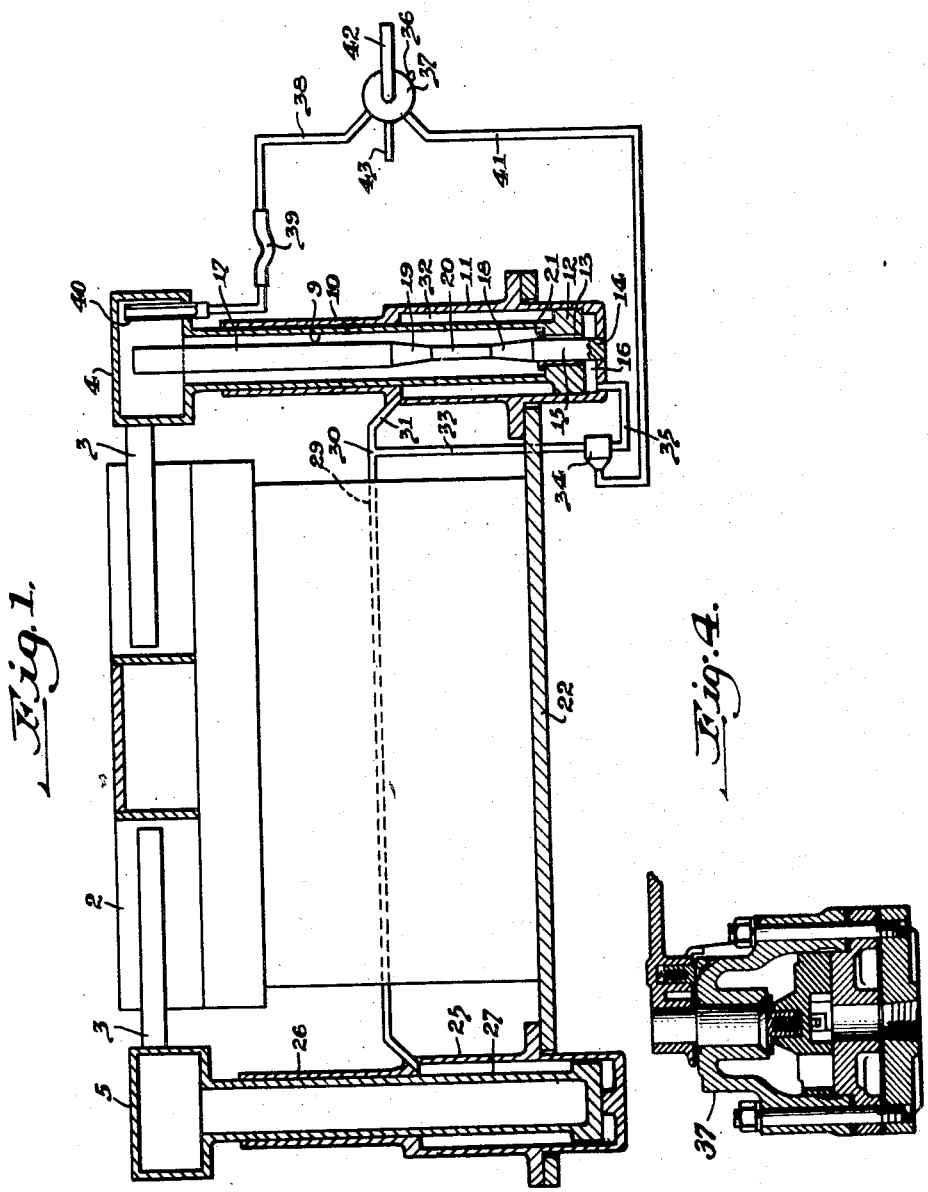

Referring now more particularly to the drawings, there is provided a support 2 for a pattern and mold, which support may be a part of the molding material packing mechanism.

The pattern and mold are adapted to be disposed upon the support 2 while they are separated one from the other. One of the mold and pattern remains stationary upon the support 2, being held in place thereon, while the other is moved upwardly in a straight line to strip the mold and pattern one from the other. The mold is ordinarily disposed in a flask, the molding material, e. g., sand, being packed in the flask about the pattern. If the flask is in upright position the pattern may be stripped from the mold by holding the flask stationary on the support 2 and raising the pattern. If the flask is inverted the pattern may be maintained in place on the support and the flask raised upwardly to strip the mold from the pattern.

The raising of the mold or pattern is effected by arms 3, four such arms being shown. Each of the arms is mounted upon one of a pair of opposed heads 4 and 5, the heads being disposed at opposite ends of the mechanism. Two arms are connected with each head and extend therefrom horizontally, the arms connected with the head 4 extending toward the arms connected with the head 5 and vice versa (see Figure 3). Each of the arms is adjustably connected with its head as shown so that it may project from the head a desired distance. In the free end of each arm is a screw 6 adapted to be maintained in fixed adjusted position by a nut 7. The screws 6 are adjusted so that the upper surfaces of the heads of the four screws are at the same elevation so that when the four arms 3 are raised together the upper surfaces of the heads of the screws 6 will simultaneously engage the flask or pattern as the case may be to move the same upwardly from the other thereof. The support 2 has slots 8 therein receiving the arms 3. When the heads 4 and 5 are down the arms 3 and the screws 6 are disposed within the slots 8 below the upper surface of the support 2. Thus the mold and pattern can be positioned on the support 2 out of contact with the arms and when the stripping step is to be performed the arms are moved upwardly to engage and raise whichever of the mold and pattern is on top.

The head 4 is an enlarged upper end of a hollow piston 9 operatively fitting within a cylinder 10. A larger cylinder 11 is disposed below and in tandem with the cylinder 10. While the cylinders 10 and 11 are separate castings they are in effect integral. The lower end of the hollow piston 9 projects into the larger cylinder 11, forming in effect a downward extension of the hollow piston. The downward extension of the hollow piston 9 carries at its lower end a piston 12 which fits within the cylinder 11. The top of the head 4 is closed so as to be substantially air or gas tight.

The piston 12, or the bottom of the hollow piston 9, has a circular central opening 13. Connected with the bottom of the cylinder 11 and projecting upwardly through the opening 13 is a speed control member 14 in the shape of a vertically positioned rod of non-uniform circular cross-section. The speed control member 14 has a lower cylindrical portion 15 of maximum diameter slightly smaller than the opening 13 so as always to provide a passage between the speed control member and the periphery of the opening. The bottom of the cylinder 11 has one or more depressions 16 communicating with the opening 13 so that as will be presently described liquid may pass downwardly through the opening 13 and lie against the bottom of the pistons 9 and 12 to force the same upwardly.

The speed control member 14 has at its upper end a cylindrical portion 17 of the same diameter as the cylindrical portion 15. Intermediate the cylindrical portions 15 and 17 are two frusto-conical portions 18 and 19 and between them a cylindrical portion 20 of minimum diameter. The lower frusto-conical portion 18 tapers gradually from the diameter of the portion 15 at its lower end to the diameter of the portion 20 at its upper end and the upper frusto-conical portion 19 tapers gradually from the diameter of the portion 20 at its lower end to the diameter of the portion 17 at its upper end. A collar 21 surrounds the speed control member 14 and normally seats upon the bottom of the interior of the hollow piston 9 coaxially with the opening 13. The internal diameter of the collar 21 is very slightly greater than the external diameter of the portions 15 and 17 of the speed control member 14 so that when the collar 21 is seated on the bottom of the hollow piston 9 and the parts are in the position shown in Figures 1 and 2 a very restricted passage is provided between the collar and the speed control member. Under certain conditions, as will presently be described, the collar 21 is lifted from its seat upon the bottom of the hollow piston 9 and when this occurs a passage of relatively great cross-sectional area is immediately opened between the interior of the hollow piston and the depressions 16. When the collar 21 is in inoperative position the cross-sectional area of the passage is determined by the wall of the opening 13 and the outer surface of the speed control member.

The cylinder 11 is mounted on a base plate 22 by means of bolts 23. The cylinder 10 is suitably connected with the cylinder 11 so that the two cylinders are in effect integral as above mentioned. Also connected with the base plate 22 by bolts 24 is a cylinder 25 of relatively great diameter surmounted by a cylinder 26 of smaller diameter. Operatively fitting in the cylinder 26 is a hollow piston 27 the top of which is constituted by the head 5 which like the head 4 is closed at its top so as to be air or gas tight. The bottom of the hollow piston 27 is closed by a plug 28.

A conduit 29 extends from a T 30 and communicates with the interior of the cylinder 25. The T 30 communicates in one direction with a conduit 31 which communicates with the annular space 32 between the cylinder 11 and the hollow piston 9. The T 30 also communicates with a conduit 33 which in turn communicates with a valve 34. The valve 34 in turn communicates with a conduit 35 which communicates with the interior of the cylinder 11 at its bottom below the piston 12. As will presently appear the valve 34 may be opened to establish communication between the conduit 33 and the conduit 35 and may be closed to disestablish that communication.

There is provided a source of gas under pressure, as, for example, compressed air, which is preferred. This may be any suitable air compressor. The compressed air is delivered from the compressor through a conduit 36 to a valve 37. Communicating with the valve 37 is a conduit 38 which through a flexible tube 39 communicates with the interior of the head 5 at the top thereof as shown at 40. Another conduit 41 leads from the valve 37 to the valve 34 to deliver to the valve 34 compressed air for operating it. Desirably the valve 34 is normally open to establish communication between the conduit 33 and the conduit 35, possibly being maintained in open position by a spring, and it is adapted to be closed when compressed air is admitted by the valve 37 into the conduit 41. The valve 37 has an operating handle 42. The valve is adapted to assume a first position in which the compressed air is not admitted to either of the conduits 38 and 41 and in which those conduits are connected with an exhaust pipe 43, a second position in which compressed air is admitted only to the conduit 41 to close the valve 34 and a third position in which compressed air is admitted to both the conduit 41 and the conduit 38.

The annular space 32 between the hollow piston 9 and the cylinder 11 is of substantially the same cross-sectional area as the effective area of the piston 27, which is the same as the cross-sectional area of the cylinder 26.

Figure 2:
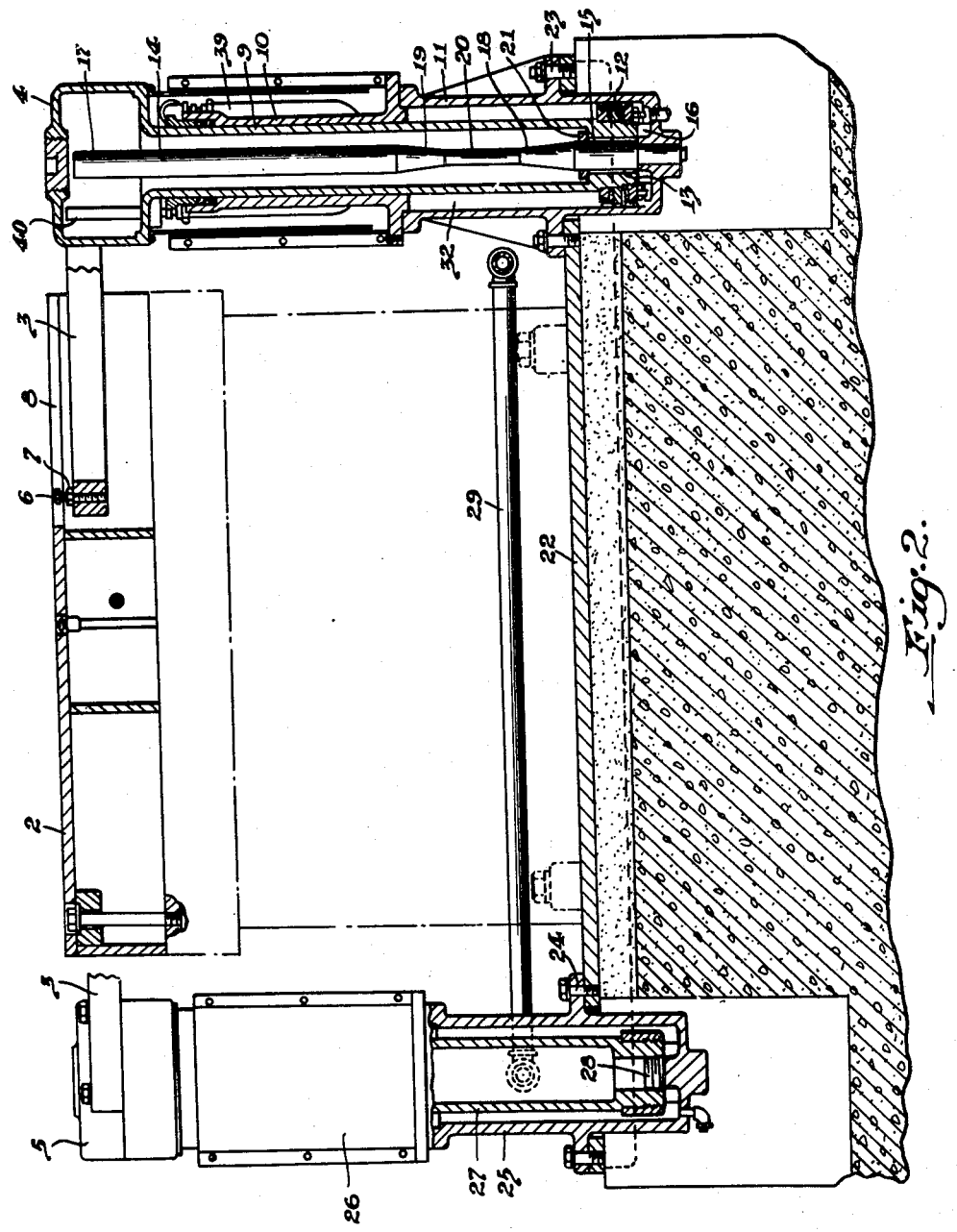
Figure 2 is a view partly in elevation and partly in vertical cross-section of stripping apparatus.

Having described the apparatus shown in the drawings, I shall now explain its operation. When a mold is to be stripped from a pattern or vice versa, initially the arms 3 are disposed within the slots 8 and the pistons 9 and 27 are at the bottoms of their strokes as shown in Figures 1 and 2. The hollow piston 9 is filled with fluid, preferably a substantially non-compressible fluid, as, for example, oil, up to a point slightly below the outlet 40 from the conduit 38—39. The opening 13, the depressions 16 and the conduit 35 are filled with the same fluid. The fluid in the hollow piston 9 need not necessarily, however, be a non-compressible fluid; a gas, such as air, may be used. The annular space 32, the conduits 31, 33 and 29, the T 30 and the annular space between the piston 27 and the cylinder 25 are likewise filled with fluid, which fluid for accurate operation should be a susbtantially non-compressible fluid, as, for example, oil. When a substantially non-compressible fluid is used in the hollow piston 9 that fluid is preferably the same as the substantially non-compressible fluid which is used for operating the piston 27 because upon opening of the valve 34 the two fluids are commingled. If different fluids are used in the hollow piston 9 and for operating the piston 27, particularly if a gas is used in the hollow piston 9, the valve 34 and the conduits 33, 35 and 41 will be of no utility and may be omitted. In the present illustration it will be assumed that the same oil is used both in the hollow piston 9 and for operating the piston 27.

The valve 37 is initially in the position in which the conduits 38 and 41 are connected to exhaust so the valve 34 is initially in open position establishing communication between the conduit 33 and the conduit 35. When the parts are so disposed all of the conduits and spaces mentioned are filled with oil from the oil reservoir which is constituted by the hollow piston 9.

Prior to stripping the valve 37 is turned to the position in which compressed air is admitted only to the conduit 41. This closes the valve 34 and disestablishes communication between the conduit 33 and the conduit 35. With the valve 34 closed and assuming the oil to be non-compressible every increment of upward movement of the piston 9 is accompanied by a like increment of upward movement of the piston 27 since the cross-sectional area of the annular space 32 is substantially equal to the effective cross-section of the piston 27 as above explained. This will also be the case if the fluid in the hollow piston 9 is a gas.

The valve 37 is turned to the position in which compressed air is maintained in the conduit 41 and also admitted to the conduit 38. The compressed air passing through the conduit 38 and the flexible tube 39 enters the head 4 through the outlet 40 where it is confined above the oil in the piston 9 and below the top of the head. As the head is airtight the air pressure in the head builds up. It places the oil under pressure. The pressure on the oil causes oil to flow downwardly through the opening between the portion 15 of the speed control member 14 and the collar 21 and thence through the opening 13 into the depressions 16 in the bottom of the cylinder 11, forcing upwardly the pistons 12 and 9. During upward movement of the pistons 12 and 9 the collar 21 remains seated on the bottom of the inside of the piston 9 as shown in Figure 2 so that the effective passage for oil from the interior of the piston 9 to the space below the pistons and within the cylinder 11 is determined by the collar 21 and the speed control member 14. As the piston 9 rises the collar comes successively opposite the tapered portion 18, the cylindrical portion 20, the tapered portion 19 and the cylindrical portion 17 of the speed control member 14. Thus the size of the effective passage through which the oil may flow from the interior to the exterior of the piston 9 is determined by the speed control member. The speed of upward movement of the piston 9 is related to the speed with which the oil can pass out of the piston. Hence the piston 9 in its upward movement moves first very slowly while the mold is being stripped from the pattern or vice versa. After the stripping has been effected the speed of the piston 9 increases as the portion 18 of the speed control member passes through the collar 21. Maximum speed is attained when the portion 20 of the speed control members enters the collar. That speed is maintained until the bottom of the portion 19 of the speed control member enters the collar. From that point upward movement of the piston 9 is gradually slowed down until when the portion 17 of the speed control member is within the collar 21 the piston is moving at minimum velocity. Thus the actual stripping action is very slow and gentle, the movement speeds up during the intermediate portion thereof and the movement slows down at the end to bring the mechanism to a smooth shockless stop. But, as above explained, since the effective cross-sectional area of the piston 27 is substantially equal to the cross-sectional area of the annular space 32, the piston 27 moves upwardly in unison or synchronism with the piston 9. And since the heads 4 and 5 are integral respectively with the pistons 9 and 27 all of the arms 3 are moved upwardly together.

When the parts are to be returned to their initial positions the valve 37 is first turned back to the position in which only the conduit 38 is open to exhaust, pressure being maintained in the conduit 41. This relieves the air pressure upon the top of the oil in the head 4. The weight of the mechanism causes the pistons 9 and 27 to move downwardly in their respective cylinders. Downward movement of the piston 9 causes displacement of oil from below the piston 12 upwardly through the opening 13 to the interior of the piston. Upward flow of oil through the opening 13 causes the collar 21 to rise so that upon downward movement of the piston 9 there is always an opening of much greater cross-sectional area for oil flow than upon upward movement. Hence the heads and the arms 3 carried thereby move downwardly with relatively great speed.

Figure 3:
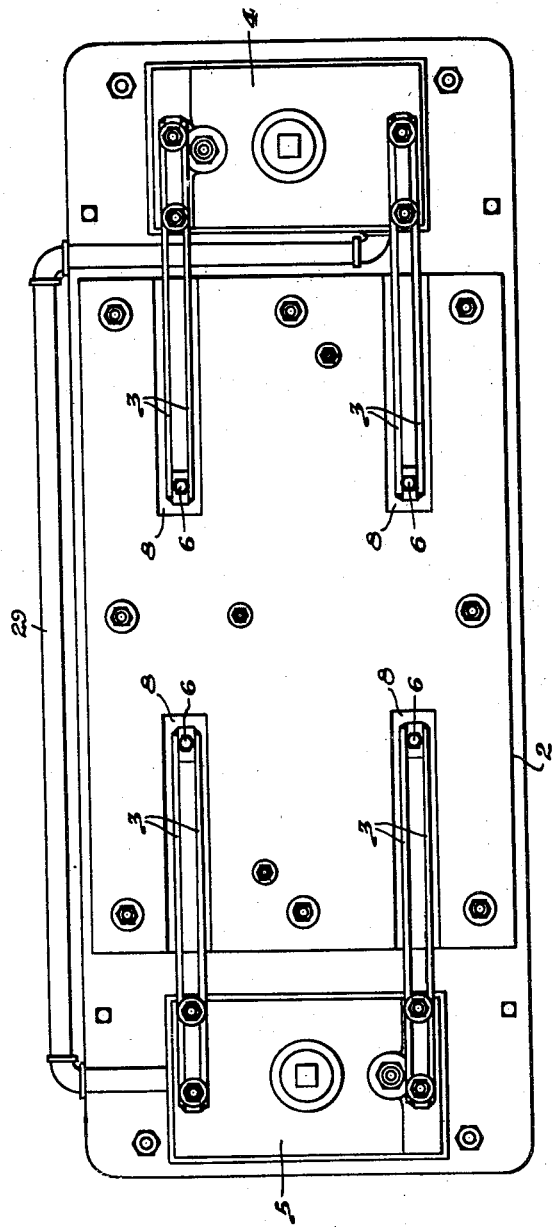
Figure 3 is a top plan view of the apparatus shown in Figure 2.

As the piston 9 moves downwardly the volume of the annular space 32 increases apace with the decrease in the volume of the space between the piston 27 and the cylinder 25 so that oil is forced back toward the right viewing Figures 1, 2 and 3 through the conduit 29.

When the pistons 9 and 27 have reached the bottoms of their strokes the valve 37 is turned back to the position in which the conduit 41 is open to exhaust while the conduit 38 remains open to exhaust. This permits the valve 34 to open. The purpose of the valve 34 is to insure that at the beginning of a stripping operation all of the conduits and spaces for oil will be completely filled with oil so that there will be no air which may be substantially compressed and hence possibly result in uneven movement of the pistons 9 and 27. The mechanism is thus rendered ready for repetition of the cycle.

While I have shown and described a present preferred embodiment of the invention it is to be distinctly understood that the invention is not limited thereto but may be otherwise variously embodied within the scope of the following claims.

I claim:

1. Mechanism for separating molds and the patterns on which they have been formed comprising means for moving one of a mold and the pattern on which it has been formed relatively to the other thereof to separate the mold and the pattern, said means comprising a smaller and a larger cylinder arranged in tandem, a hollow smaller piston fitting in the smaller cylinder and having an extension extending into the larger cylinder, a larger piston fitting in the larger cylinder carried by the extension, the extension and the larger cylinder defining an annular space, means for admitting fluid under pressure directly into the hollow piston separately from the cylinders, the larger piston having an opening therein through which fluid under pressure within the hollow piston is delivered to a position behind the larger piston in the larger cylinder to move the pistons, a third piston movable in a path parallel to the path of movement of the smaller piston, the third piston being fluid operated to move in its path, the larger piston displacing fluid from the annular space to operate the third piston, the cross-sectional area of the annular space being substantially equal to the effective area of the third piston against which the fluid displaced from the annular space operates, and connections between the smaller piston and the third piston on the one hand and the mold or pattern to be moved on the other hand whereby separation of the mold and pattern is effected upon movement of the pistons.

2. Mechanism for separating molds and the patterns on which they have been formed comprising means for moving one of a mold and the pattern on which it has been formed relatively to the other thereof to separate the mold and pattern, said means comprising a smaller and a larger cylinder arranged in tandem, a hollow smaller piston fitting in the smaller cylinder and having an extension extending into the larger cylinder, a larger piston fitting in the larger cylinder carried by the extension, the extension and the larger cylinder defining an annular space, means for admitting fluid under pressure directly into the hollow piston separately from the cylinders, the larger piston having an opening therein through which fluid under pressure within the hollow piston is delivered to a position behind the larger piston in the larger cylinder to move the pistons, an elongated control member connected with the cylinder, of non-uniform cross-section and projecting within said opening to partially close the same and determine the effective area thereof so that as the pistons move in their respective cylinders the control member moves within the opening thus variably controlling the speed of admission of fluid and hence the speed of movement of the pistons, a third piston movable in a path parallel to the path of movement of the smaller piston, the third piston being fluid operated to move in its path, the larger piston displacing fluid from the annular space to operate the third piston, the cross-sectional area of the annular space being substantially equal to the effective area of the third piston against which the fluid displaced from the annular space operates, and connections between the smaller piston and the third piston on the one hand and the mold or pattern to be moved on the other hand whereby separation of the mold and pattern is effected at variable speed upon movement of the pistons.

3. Mechanism for separating molds and the patterns on which they have been formed comprising means for moving one of a mold and the pattern on which it has been formed relatively to the other thereof to separate the mold and pattern, said means comprising a smaller and a larger cylinder arranged in tandem, a hollow smaller piston fitting in the smaller cylinder and having an extension extending into the larger cylinder, a larger piston fitting in the larger cylinder carried by the extension, the extension and the larger cylinder defining an annular space, means for admitting fluid under pressure directly into the hollow piston separately from the cylinders, the larger piston having an opening therein through which fluid under pressure within the hollow piston is delivered to a position behind the larger piston in the larger cylinder to move the pistons, means cooperating with the opening operably positionable during delivery of fluid from within the hollow piston to a position behind the larger piston in the larger cylinder to restrict the effective area of the opening and inoperably positionable during passage of fluid through the opening in the reverse direction, a third piston movable in a path parallel to the path of movement of the smaller piston, the third piston being fluid operated to move in its path, the larger piston displacing fluid from the annular space to operate the third piston, the cross-sectional area of the annular space being substantially equal to the effective are of the third piston against which the fluid displaced from the annular space operates, and connections between the smaller piston and the third piston on the one hand and the mold or pattern to be moved on the other hand whereby separation of the mold and pattern is effected, the speed of movement of the connections in separating the mold and pattern being slower than the speed of movement of the connections in the opposite direction.

4. Mechanism for separating molds and the patterns on which they have been formed comprising means for moving one of a mold and the pattern on which it has been formed relatively to the other thereof to separate the mold and pattern, said means comprising a smaller and a larger cylinder arranged in tandem, a hollow smaller piston fitting in the smaller cylinder and having an extension extending into the larger cylinder, a larger piston fitting in the larger cylinder carried by the extension, the extension and the larger cylinder defining an annular space, means for admitting fluid under pressure directly into the hollow piston separately from the cylinders, the larger piston having an opening therein through which fluid under pressure within the hollow piston is delivered to a position behind the larger piston in the larger cylinder to move the pistons, a collar of smaller internal dimension than the opening cooperating with the opening operably positionable during delivery of fluid from within the hollow piston to a position behind the larger piston in the larger cylinder to restrict the effective area of the opening and inoperably positionable during passage of fluid through the opening in the reverse direction, an elongated member connected with the cylinder and projecting within the opening to partially close the same, the elongated member and the collar determining the effective area of the opening during delivery of fluid from within the hollow piston to a position behind the larger piston in the larger cylinder and the elongated member and the opening itself determining the effective area of the opening during passage of fluid through the opening in the reverse direction, a third piston movable in a path parallel to the path of movement of the smaller piston, the third piston being fluid operated to move in its path, the larger piston displacing fluid from the annular space to operate the third piston, the cross-sectional area of the annular space being substantially equal to the effective area of the third piston against which the fluid displaced from the annular space operates, and connections between the smaller piston and the third piston on the one hand and the mold or pattern to be moved on the other hand whereby separation of the mold and pattern is effected, the speed of movement of the connections in separating the mold and pattern being slower than the speed of movement of the connections in the opposite direction.

5. Mechanism for separating molds and the patterns on which they have been formed comprising means for moving one of a mold and the pattern on which it has been formed relatively to the other thereof to separate the mold and pattern, said means comprising a smaller and a larger cylinder arranged in tandem, a hollow smaller piston fitting in the smaller cylinder and having an extension extending into the larger cylinder, a larger piston fitting in the larger cylinder carried by the extension, the extension and the larger cylinder defining an annular space, means for admitting fluid under pressure directly into the hollow piston separately from the cylinders, the larger piston having an opening therein through which fluid under pressure within the hollow piston is delivered to a position behind the larger piston in the larger cylinder to move the pistons, a collar of smaller internal dimension than the opening cooperating with the opening operably positionable during delivery of fluid from within the hollow piston to a position behind the larger piston in the larger cylinder to restrict the effective area of the opening and inoperably positionable during passage of fluid through the opening in the reverse direction, an elongated member connected with the cylinder and projecting within the opening to partially close the same, the elongated member being of non-uniform cross-section, having a portion of relatively great cross-section disposed within the opening at the time of commencement of separation of the mold and pattern and a portion of relatively small cross-section disposed within the opening at a subsequent time whereby to restrict the flow of fluid through the opening during stripping to cause relatively slow relative movement between the mold and pattern during part of the separating stroke and thereafter during said stroke allow less restricted flow to cause relatively fast relative movement between the mold and pattern during a subsequent part of the separating stroke, the elongated member and the collar determining the effective area of the opening during delivery of fluid from within the hollow piston to a position behind the larger piston in the larger cylinder and the elongated member and the opening itself determining the effective area of the opening during passage of fluid through the opening in the reverse direction, a third piston movable in a path parallel to the path of movement of the smaller piston, the third piston being fluid operated to move in its path, the larger piston displacing fluid from the annular space to operate the third piston, the cross-sectional area of the annular space being substantially equal to the effective area of the third piston against which the fluid displaced from the annular space operates, and connections between the smaller piston and the third piston on the one hand and the mold or pattern to be moved on the other hand whereby separation of the mold and pattern is effected, the speed of movement of the connections in separating the mold and pattern being slower than the speed of movement of the connections in the opposite direction.

6. Actuating mechanism comprising a smaller and a larger cylinder arranged generally vertically in tandem with the smaller cylinder above the larger cylinder, a hollow piston fitting in the smaller cylinder and having a downward extension extending into the larger cylinder, a piston fitting in the larger cylinder carried by the extension, the upper end of the hollow piston being closed, the hollow piston containing liquid, a source of gas under pressure, a connection from the source to the interior of the upper end of the hollow piston, a passage from the interior of the hollow piston to a point within the larger cylinder below the piston fitting therein so that gas under pressure introduced into the hollow piston through the connection may force liquid through the passage and cause the liquid to raise the pistons, the extension and the larger cylinder defining an annular space, a third cylinder arranged generally vertically, a piston fitting therein, a conduit leading from the annular space adjacent the upper end thereof to a point within the third cylinder below the piston fitting therein, a liquid in the annular space and in the conduit, the piston in the larger cylinder forcing liquid from the annular space into the conduit to raise the third piston when the first mentioned pistons are raised, the cross-sectional area of the annular space being substantially equal to the effective area of the third piston against which the liquid forced through the conduit operates so that the pistons all move upward in unison, another conduit connecting the space containing the first mentioned liquid and the space containing the second mentioned liquid, a valve in that conduit which is openable to establish communication between the space containing the first mentioned liquid and the space containing the second mentioned liquid and closable to disestablish said communication, a connection from the source of gas under pressure to the valve for closing the valve and means controlling the flow of gas under pressure from the source through the respective connections.

7. Actuating mechanism comprising a smaller and a larger cylinder arranged generally vertically in tandem with the smaller cylinder above the larger cylinder, a hollow piston fitting in the smaller cylinder and having a downward extension extending into the larger cylinder, a piston fitting in the larger cylinder carried by the extension, the upper end of the hollow piston being closed, the hollow piston containing liquid, a source of gas under pressure, a connection from the source to the interior of the upper end of the hollow piston, a passage from the interior of the hollow piston to a point within the larger cylinder below the piston fitting therein so that gas under pressure introduced into the hollow piston through the connection may force liquid through the passage and cause the liquid to raise the pistons, the extension and the larger cylinder defining an annular space, a third cylinder arranged generally vertically, a piston fitting therein, a conduit leading from the annular space adjacent the upper end thereof to a point within the third cylinder below the piston fitting therein, liquid in the annular space and in the conduit, the piston in the larger cylinder forcing liquid from the annular space into the conduit to raise the third piston when the first mentioned pistons are raised, the cross-sectional area of the annular space being substantially equal to the effective area of the third piston against which the liquid forced through the conduit operates so that the pistons all move upward in unison, another conduit connecting the space containing the first mentioned liquid and the space containing the second mentioned liquid, a valve in that conduit which is normally open to establish communication between the space containing the first mentioned liquid and the space containing the second mentioned liquid and closable to disestablish said communication, a connection from the source of gas under pressure for closing the valve and a control valve operable to admit gas under pressure from the source selectively to only the first mentioned valve to close the same or simultaneously to both the first mentioned valve and the upper end of the hollow piston.

TIRZAH A. RENKENBERGER.

REFERENCES CITED

The following references are of record in the file of this patent:

UNITED STATES PATENTS

| Number | Name | Date |
|---|---|---|
| 961,702 | Lewis | June 14, 1910 |
| 1,689,145 | Lunati | Oct. 23, 1928 |
| 1,864,325 | Steedman | June 21, 1932 |
| 1,931,902 | Oyster | Oct. 24, 1933 |
| 1,944,351 | Landry | Jan. 23, 1934 |
| 1,958,960 | Warner | May 15, 1934 |
| 2,085,961 | Dorward | July 6, 1937 |
| 2,169,113 | Sheppard | Aug. 8, 1939 |
| 2,288,511 | Bratz | June 30, 1942 |

FOREIGN PATENTS

| Number | Country | Date |
|---|---|---|
| 290,828 | Great Britain | May 24, 1928 |

Certificate of Correction

October 11, 1949

Patent No. 2,484,646

TIRZAH A. RENKENBERGER

It is hereby certified that errors appear in the printed specification of the above numbered patent requiring correction as follows:

Column 3, line 33, for "tthey" read *they*; column 6, line 60, after "head", for the indistinct reference numeral read *4*; column 10, line 45, for "are" read *area*; and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*